April 21, 1953 — W. N. PARKER — 2,636,141
ELECTRON DISCHARGE DEVICE
Filed June 24, 1950 — 4 Sheets-Sheet 1

INVENTOR
William N. Parker
BY
William A. Zalesak
ATTORNEY

April 21, 1953     W. N. PARKER     2,636,141
ELECTRON DISCHARGE DEVICE
Filed June 24, 1950     4 Sheets-Sheet 2
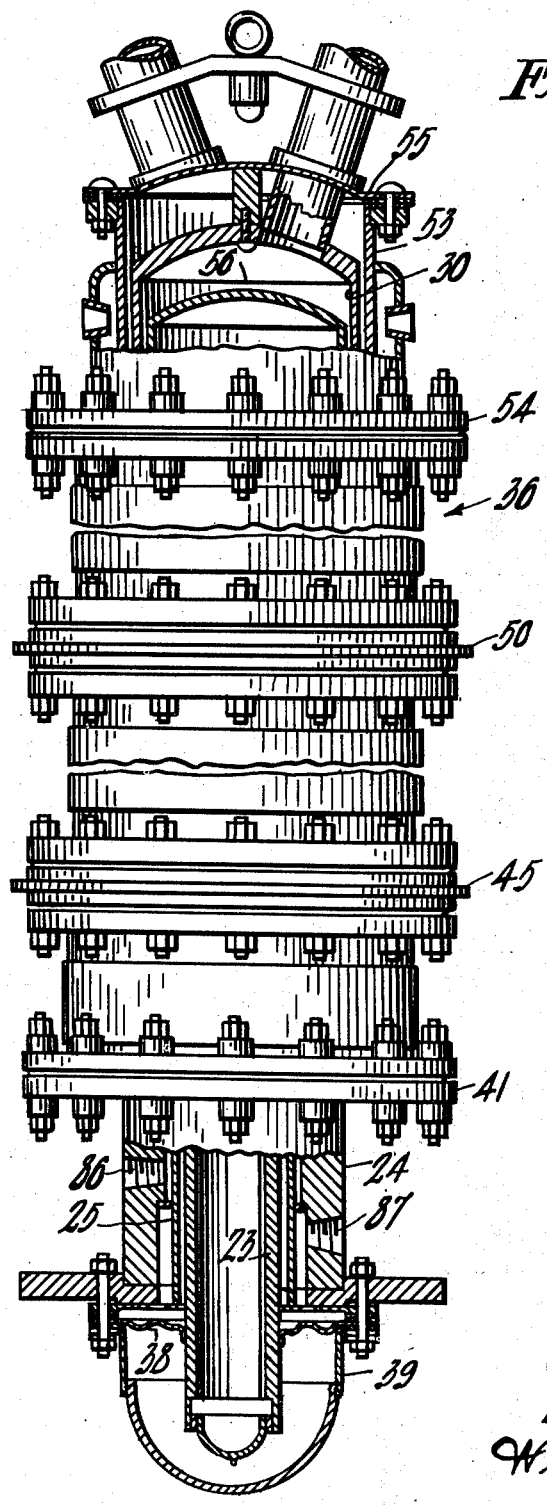
INVENTOR
William N. Parker
BY
William A. Zalesak
ATTORNEY

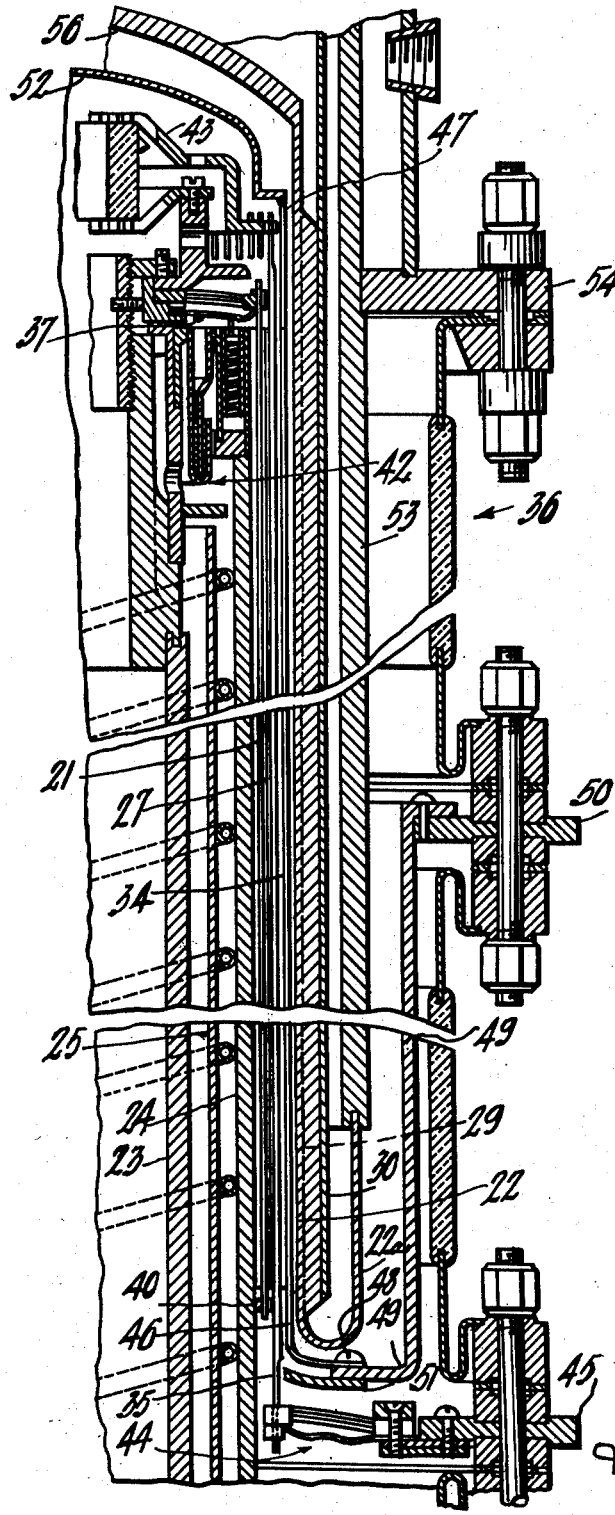

April 21, 1953  W. N. PARKER  2,636,141
ELECTRON DISCHARGE DEVICE
Filed June 24, 1950  4 Sheets-Sheet 4
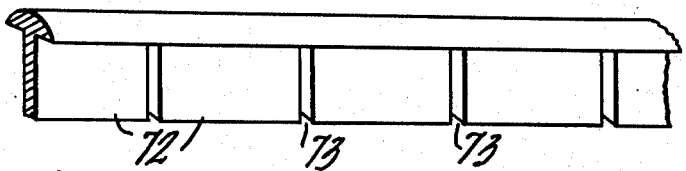
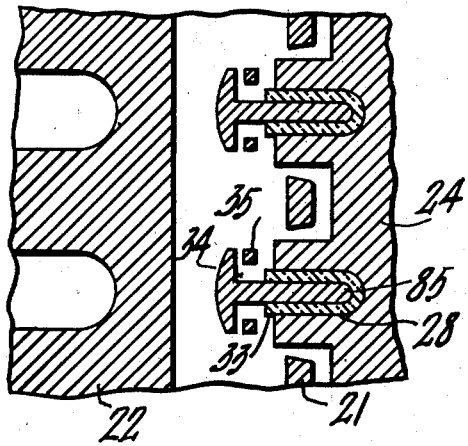
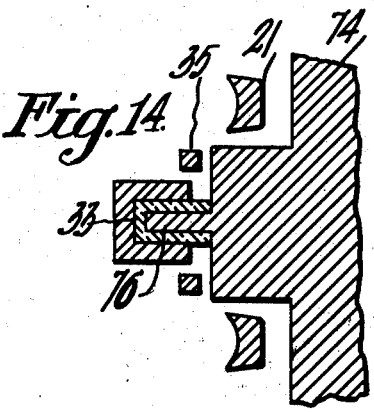
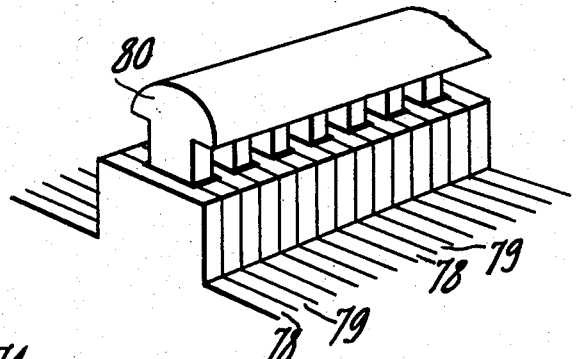
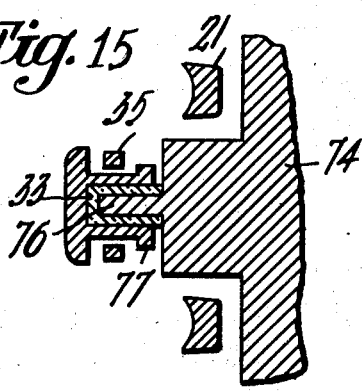
INVENTOR
*William N. Parker*
BY
*William A. Balesak*
ATTORNEY Patented Apr. 21, 1953

2,636,141

UNITED STATES PATENT OFFICE 2,636,141

ELECTRON DISCHARGE DEVICE

William N. Parker, Lancaster, Pa., assignor to Radio Corporation of America, a corporation of Delaware Application June 24, 1950, Serial No. 170,097

35 Claims. (Cl. 313—20)

My invention relates to electron discharge devices, more particularly though not exclusively to such devices useful at the lower as well as higher radio frequencies and capable of delivering extremely large amounts of power.

The provision of a device which will operate at radio frequencies and deliver large amounts of useful power presents serious problems incapable of solution with conventional designs.

The dissipation of heat generated during operation is one of the most serious problems. Both the electrodes as well as the seal structures require protection against excessive temperature. In fact, a serious limitation on the power output of electron discharge devices is the grid operating temperature. The grid absorbs considerable heat energy as a result of electron bombardment and electron collection during the positive portion of the grid radio frequency operating cycle. Heat dissipation from the conventionally long, slender grid elements is almost entirely due to thermal radiation to cooler parts. This results in such a high operating temperature that electron emission can take place from the grid.

Heat causes expansion and contraction of the elements the device, thus affecting spacings, alinements and operating stability. The need to dissipate heat from all electrodes and elements requires structures which with conventional design adversely affect the electrical characteristics. For example, inductances, capacitances and electron transit times are increased.

Even where conventional devices have been capable of satisfactory operation under normal conditions short duration overloads usually result in serious, if not permanent, damage. The fine grid wire structures conventionally used are particularly susceptible to damage from the heat generated by a grid-anode flash-arc.

By decreasing the grid-cathode spacing, considerable improvement in efficiency is possible. The advantages of reduced grid dissipation, radio frequency driving power, and anode loss which result from such reduced spacing are difficult to attain with conventional structures. One reason for this is the susceptibility of the conventional grid structure to deformation as a consequence of repeated temperature cycling.

Triode tubes in amplifier operation pass radio frequency power as a result of electron acceleration by the field set up during the positive cycle of the radio frequency input. At the higher frequencies this represents considerable radio frequency power which is absorbed or fed through by the tube. This, of course, represents a substantial loss in efficiency. A power gain of only three or four is very often all that is attained with a triode in a grounded grid amplifier circuit.

The provision of a screen grid may improve the efficiency of a tube provided the screen, which is between the grid and anode, can be maintained at the same radio frequency potential as the cathode. In conventional tetrode tubes, it becomes more and more difficult to maintain the screen grid and cathode at the same radio frequency potential as the frequency of operation is raised. The same is true at higher power levels. The impedance from an active point on the cathode around the by-pass circuit to an opposite point on the screen grid becomes more and more inductive as the frequency or the power is increased. Also interelectrode capacities cause reactive circulating currents which increase with frequency or power.

A further limitation of screen grid power tubes is set by the permissible screen grid heat dissipation as pointed out above in the case of control grids. This is particularly true of screen grids since they are operated at fairly high positive direct current potential.

It is, therefore, a principal object of my invention to provide an improved electron discharge device particularly useful as an amplifier and which delivers large amounts of power at radio frequencies.

Another object of my invention is to provide an electron discharge device having short leads and accurately maintained close spacings yet capable of large continuous power outputs at the higher frequencies and; in which efficient cooling is obtained; and in which interelectrode and lead capacitances and inductances are maintained at very low values.

Another object is the provision of an electron discharge device having a rugged control grid or screen grid capable of extremely high average dissipation and of withstanding even higher short duration overloads.

Yet another object is the provision of an electron discharge device having close spacings which are accurately maintained and in which the effects of temperature cycling are eliminated.

A further object is the provision of an electron discharge device characterized by high power gains at the higher frequencies.

Another object is the provision of an electron discharge device in which the screen grid is maintained effectively at the radio frequency potential of the cathode at even the high frequencies.

A still further object of my invention is to provide means for fluid cooling of grid electrodes, including control and screen grids.

Yet another object of my invention is to provide novel and improved grid electrodes including control and screen grids resulting in improved characteristics and efficiencies.

Still another object is the provision of an electron discharge device in which feed back or coupling between the input and output circuits within the device is substantially minimized.

Briefly, an electron discharge device made in accordance with my invention includes electrodes or elements having projections which extend parallel to the electron paths. The projections are preferably substantially coextensive with the active portions of the electrodes and supported by a metal member. Both the metal member and the projections may be directly fluid cooled.

The novel features which I believe to be characteristic of my invention are set forth in the appended claims. The invention itself will best be understood by reference to the following description taken in connection with the accompanying drawing in which:

Figure 3 is an elevational view partially in section of an electron discharge device in the form of a tetrode constructed in accordance with my invention;

Figure 4 is a longitudinal sectional view thereof partially broken away for convenience;

Figure 12 is a perspective view partially broken away of another form of electrode;

Figure 13 is a fragmentary sectional view of the tetrode shown in Figure 2;

Figures 14 and 15 are fragmentary sectional views of electrode arrangements which may be employed with my invention; and Figure 16 is a fragmentary perspective view of another form of electrode and support which may be employed with my invention.

For the purpose of illustration, my invention will be described in connection with triode and tetrode type electron discharge devices. However, it should be understood that it is not limited to the particular devices shown. As will be apparent, certain features of the illustrative devices are described and claimed in my copending joint application with L. P. Garner and W. E. Harbaugh, filed March 17, 1949, Serial No. 81,932 and which is assigned to the same assignee as my present application. Details of construction which are common to both will not be described in detail here in the interest of brevity and clarity except where necessary for a complete understanding of my present invention.

Figure 1:
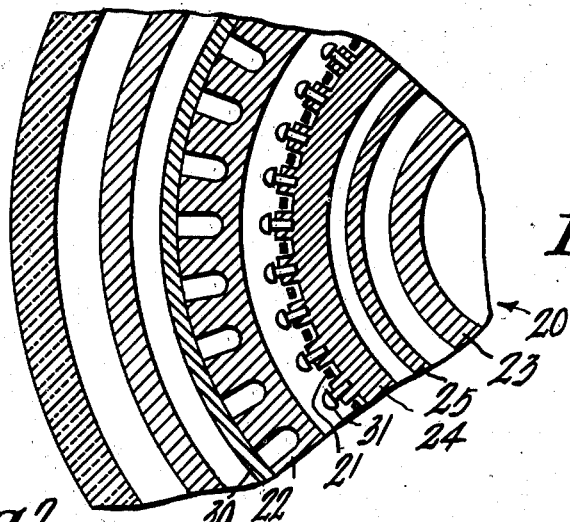
Figure 1 is a partial transverse sectional view of a triode tube constructed in accordance with my invention.
Figure 2:
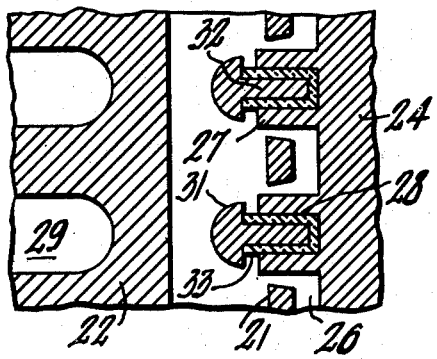
Figure 2 is a partial sectional view on an enlarged scale of the active electrode region of Figure 1 with the electrodes shown in planar array.

Referring now to the drawing and to Figures 1 and 2 in particular, it is seen that electron discharge device 20 is internally cooled as by water. Water cooled supporting conductors 23, 24 are mechanically and conductively connected to the electron emitter or cathode elements 21 at the ends thereof as will be pointed out. Water partition 25 extends between supporting conductors 23, 24.

Outer supporting conductor 24 functions as the beam former of said copending application, and has grooves or slots 26 formed therein in which cathode elements 21 extend. Lands 27, between grooves 26, are also slotted as at 28.

Facing cathode elements 21 is an electron collector or anode 22 which is also water cooled. Anode 22 has elongated water channels 29 formed therein closed on one side by loosely fitting sleeve 30.

In operation, dense sheets of electrons pass from each cathode element 21 which serves as a copious source of electrons across to collector or anode 22. As pointed out in said copending application the corners of lands 27 form a converging electric field at the surface of each of the cathode elements which has a focusing effect upon the electrons.

For further affecting the flow of electrons, I provide means on supporting conductor 24 and which extend in the region between the cathode and anode. I preferably utilize members substantially T-shaped in cross section supported in slots 28 formed intermediate slots 26. As in Figure 1, these may be control electrode or grid elements 31 having projections or legs 32 seated in slots 28. Projections or legs 32 are insulated from supporting conductor 24 in order that control electrode elements 31 may be operated at a direct current potential different from that of conductor 24.

I preferably form elements 31 and conductor 24 of copper or other good electrical and heat conducting material which may be formed into the desired shapes. Insulation 33 is made of thin sheets of mica or other material having suitable electrical and heat conducting properties, suitable for use in vacuum and which can withstand the high temperatures at which device 20 is processed. For example, I may use a glass or glaze which wets and seals to copper and has a good thermal expansion match with copper.

As is clearly apparent from Figures 3 and 4 wherein is shown a tetrode similar in many respects to device 20, cathode elements 21, anode 22, supporting conductors 23, 24 and grid elements 31 are elongated. Grid elements 31 throughout the active electron region are in good heat exchange relation with supporting conductor 24. Heat dissipation from the grid elements instead of by radiation or conduction axially, is effected mainly by conduction along projections 32 through insulation 33 to the cooled metal of conductor 24. This construction makes it possible for elements 31 to dissipate a substantially great amount of power without appreciable heating and permits larger currents than heretofore possible to be drawn from cathode elements 21.

From Figure 13 it will be seen that I have provided means for affecting the electron streams between cathode elements 21 and anode 22 supported on supporting conductor 24 in the form of screen grid elements 34. Screen grid elements 34 are also preferably T-shaped in cross section and have a projection or leg 35 seated in slots 28. In addition to providing a heat conduction path along the entire active axial length of elements 34, insulation 33 also forms a by-pass condenser for the circulating currents of the output circuit. This serves to maintain screen grid elements 34 and cathode elements 21 at the same radio frequency potentials as will be seen. Control grid elements 35 are similar to the grid elements of said copending application and, as will be more fully pointed out, are similarly mounted.

Referring now to Figures 3 and 4 electron discharge device 36 is an internally water cooled beam power tetrode having a demountable evacuated envelope as shown.

Each of the cathode elements 21, as in said copending application, is supported adjacent its upper end by a flexible support means indicated generally at 37 supported from central supporting conductor 23. Supporting conductor 23 is connected at its lower end to a copper diaphragm 38 by means of which it is connected electrically to terminal ring 39.

The lower or other end of each cathode element 21 is mounted in ring 40 brazed to supporting conductor 24 just below the lower end of the beam former array. Supporting conductor 24 is coaxial and concentric with supporting conductor 23 and has a lower portion of increased diameter. Supporting conductor 24 is connected to terminal ring 41 and below the ring forms part of the exterior of the tube. As shown most clearly in Figure 3, an inlet 86 and outlet 87 communicating with opposite sides of partition 25 are formed in the exterior portion of conductor 24.

As previously pointed out in connection with Figures 1 and 2, conductor 24, in the active electron region of tube 36, has a plurality of grooves or slots 26 formed therein through which each of cathode elements 21 extends.

It should be noted that the supporting conductors 23, 24 are rigidly connected by a mechanically strong insulating and hermetic seal indicated generally at 42.

Insulated from and supported on central conductor 23 is a hat shaped support member 43 having a peripheral flange at its lower extremity with slots and centering or locating V notches formed therein. There is one slot for each control grid element 35 of which there are two for each cathode element 21 as is apparent from Figure 13. Grid elements 35 each hook into grid support member 43 and are accurately positioned by means of the slots and V notches. Adjacent their lower ends, each grid element 35 is hooked into a separate flexible support means 44 which in turn are supported from grid terminal ring 45. Flexible support means 37 and 44, as described in detail and claimed in the copending application of W. E. Harbaugh filed May 26, 1949, Serial Number 95,442, are laminated; support 37 being only highly flexible while supports 44 are each both flexible and resilient.

Each of the elongated T-shaped screen grid elements 34 extend in slots 28 and, as pointed out, is conductively insulated from the walls of the slots by thin insulation 33. The heads or cross arms of the T-shaped members 34 extend axially beyond projections or legs 85 and form extensions 46, 47 (Figure 4). Each of the lower extensions 46 are connected by bolts 48 to annular conductive support member 49 which, in turn, is connected to terminal ring 50 which together form the lead-in for the screen grid. A shield in the form of an apertured annular ring 51 is also connected to member 49 by bolts 46 and provides additional shielding between the input and output circuits at that region.

Upper extensions 47 are bolted to a cup-shaped shield member 52 having an outwardly turned peripheral flange. Shield member 52 completes the shielding which, as is seen, provides complete isolation between the input and output circuits in electron discharge device 36.

As is apparent from Figure 4, anode 22 is reentrant and has a turned back portion 22a joined to conductive support 53. Support 53 is connected to anode terminal ring 54 which together form the lead for the anode. At its upper end support 53, as in said copending joint application, is connected to header 55 (Figure 3) which is in turn connected to water partition or sleeve 30. Anode 22 is also coaxial and concentric with supporting conductors 23, 24, and has its inner end closed by end wall 56.

The triode indicated generally at 20 (Figure 1) is similar in construction to the tetrode just described and indicated generally by numeral 36. In the former, elements corresponding to grids 35 together with the attendant mount structure are not present. Thus, in tube 20, the grid supporting structure above the flexible cathode support means 37 is omitted. Grid elements 31 each have upper and lower axial extensions corresponding to extensions 46, 47. The upper extensions of grid elements 31 are connected to a shield similar to cup-shaped shield 52. The flexible grid support 44 of tube 36 is also omitted and instead the lower grid element extensions are connected to terminal ring 45. Terminal ring 50 and its seal is also omitted and a single insulating glass spool is provided between terminals 45 and 54 instead of the two shown in Figure 4. It is believed that from the foregoing comparison of tubes 20 and 36, the complete structure of tube 20 is clearly brought out and that a separate drawing showing such a tube is unnecessary.

My invention readily lends itself to a wide variety of forms, some of which are shown in the drawing, each having its own mechanical and electrical characteristics.

Figure 5:
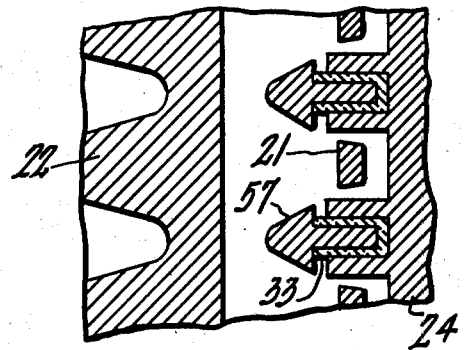
Figures 5–10 are sectional views of electrodes or elements which may be employed with my invention.
Figure 6:
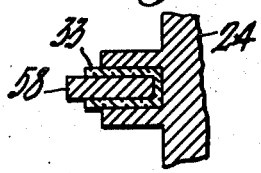

In Figure 5 are shown grid elements having V heads 57 with rounded apices while in Figure 6 the heads of the grid elements are omitted entirely. In the latter case projections 58 function as the grid elements and give extremely low grid absorption. However, this form requires relatively high driving voltage for operation as a power converter.

Figure 7:
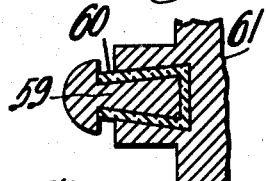

In Figure 7, projection or leg 59 is tapered and with a reversely tapered slot or groove 60 serves to key the grid elements into supporting conductor 61.

Figure 8:

In Figure 8, projections or legs 62 are V shaped and provide a better heat conduction path than tapered projections 59 shown in Figure 7. Insulation 33 here may be a single thin sheet of mica bent around to fit between projections 62 and supporting conductor 63.

Figure 9:
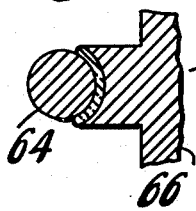
Figure 10:
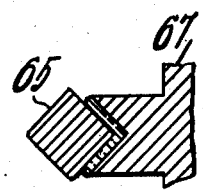

In Figure 9, the grid elements are shown as cylindrical rods 64 while in Figure 10 they are square rods 65. Though simplifying the forming of supporting conductors 66, 67 respectively, these structures are not as rugged as those previously described.

Figure 11:
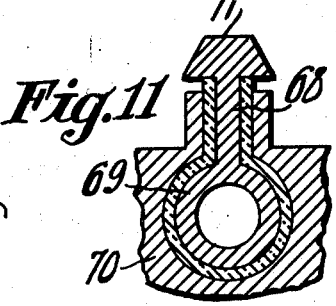
Figure 11 is a sectional view of a construction by means of which additional cooling may be had.

As shown in Figure 11, additional cooling is provided by forming the inner end of projections 68 in the form of fluid conducting tubes 69. Tubes 69 need not necessarily be integral with projections 68 but may conveniently be in the form of conduits connected thereto by any suitable good heat conducting solder. Pairs of conduits 69 may be joined at their upper ends while the lower ends are connected to an inlet and an outlet in the lower portion of supporting conductor 70 which as in the case of supporting conductor 24, forms a portion of the external envelope of the device. Here the grid elements have heads 71 which are trapezoidal in cross section.

Instead of connecting conduits 69 in pairs each conduit may be closed at its upper end and include within it a second conduit of smaller diameter (not shown) open at its upper end. The lower ends of all the inner conduits are then brought to a single inlet while the lower ends of conduits 69 are then all brought to a single outlet.

It is to be understood that the inlets are connected to sources of fluid coolant such as water under pressure.

Where a considerable difference in temperature may exist between the heads or cross arms of the elements and the projections or legs, I provide each element with a plurality of projections or legs 72 of relatively short axial length separated by narrow gaps or slits 73. This is not readily practiced in connection with the fluid cooled projections 69 of Figure 11 and I there, when necessary, provide narrow slits along the head or cross arm portion.

As shown in Figure 14, I may also provide projections 76 which are integral with or conductively connected to the supporting conductor 74 which corresponds to conductor 24. Elements 75 function as the screen grid and are U-shaped in cross section to receive projections 76. Insulation 33 serves as direct current insulation between elements 75 and conductor 74.

The means for affecting the electron stream in addition to the control and screen electrodes described, includes other electrodes or elements for affecting the electron streams through the action of the electric field created by them. For example, another type of element is shown in Figure 15 where a space charge electrode or grid is provided by extensions 77. A positive polarity electric field gradient is formed at the emitting surface of cathodes 21 without the potential of control grid elements 35 going positive. Such a tube passes the high peak plate currents required for efficient high power output with zero control grid current and electronic driving power.

In Figure 16 is seen still another form of construction. Here, the supporting conductor, which corresponds to conductor 24, is made up of a plurality of laminations 78, 79 joined together in a known manner. Recesses are provided for spaced projections or legs 80 which are insulated from laminations 78, 79 and are connected to element 81 which may function as an electrode or electrostatic element.

Additional cooling may be readily provided when desired by increasing the area of the heat exchange interface. This may readily be done by increasing the number of projections, either on the electrode or the supporting conductor which are then in interleaved relation.

Electron discharge devices made in accordance with my invention maintain close effective spacings. In connection with a triode tube the close effective grid-cathode spacing makes possible higher output and efficiency with lower driving power. The provision of relatively massive grid electrode elements which are conductively cooled makes possible an exceptionally stable tube. The capacitance developed between the grid elements and the beam former or supporting conductor 24 forms an appreciable portion of the grid-cathode tank circuit capacitance. Since this is located right at the grid elements, high frequency parasitic oscillations are minimized.

Such a device as tetrode tube 36 makes possible high power gains in amplifier applications since the screen grid elements are more effectively by-passed to the cathode than was heretofore thought possible. In such a device there is substantially no fed through power as with conventional constructions. The effective conduction cooling of the screen grid elements makes possible more efficient operation. Because of the increased dissipation capability, the anode voltage can swing lower without the increased screen grid current tending to overheat the grid. The increased anode voltage swing means greater output and efficiency.

As pointed out, and particularly at the higher frequencies, the capacitance developed between projections 85 connected to elements 34 and supporting conductor 24 serves as the radio frequency by-pass between the screen grid and cathode. All portions of each screen grid element in the active electron region of device 36 are maintained at substantially the same radio frequency voltage as supporting conductor 24. Any circulating currents which may flow between the screen grid and conductor 24 flow radially inward along the surfaces of projections 85, through insulation 33, directly to conductor 24. This radio frequency path is one of extremely low impedance. It is also apparent that the circulating currents of the input circuit travel axially along the control grid elements 35 and at an angle of 90 degrees with respect to the output circuit currents just described. As a result coupling between the circulating currents of output and input circuits is reduced to a minimum.

Instead of directly heated or self-heating elements 21, I may utilize an indirectly heated cathode having a plurality of spaced electron emission surfaces as shown and described in the copending application of L. P. Garner. Said Garner application is assigned to the same assignee as my present application and was filed simultaneously therewith. As shown and described in said copending application, a plurality of channeled support members are provided each of which may be connected to supporting conductor 24, preferably in slots 26. Emission material may be readily coated on a surface of said support members and a heater provided in each of the channels formed between the supporting conductor 24 and each of the support members.

From the foregoing, it is apparent that electron discharge devices constructed in accordance with my invention are capable of operation at greater efficiency at the lower as well as higher frequencies as well as handling considerably higher power with greater gain than devices heretofore in use. Furthermore, my invention is subject to wide variation and modification without departing from the scope thereof. Therefore, it is intended to cover all such modifications and variations as come within the scope of the appended claims.

Reference is made to copending application 170,231 disclosing subject matter which appears in this application.

I claim:

1. An electron device, comprising at least two electrodes in spaced relation, one of said electrodes including an array of spaced apart elements, the other of said electrodes and each of said elements having an elongated active portion, and insulative means individually connecting substantially the entire active length of each of said elements to substantially the entire active length of said other electrode.

2. An electron device, comprising a cathode assembly having a plurality of spaced electron emission surfaces, an anode spaced from said cathode assembly, an electrode comprising an array of elements in the region between said emission surfaces and said anode and, dielectric means individually connecting each of said elements along the entire active portion thereof to said cathode assembly.

3. An electron discharge device, comprising a supporting conductor, an electron emitter supported by said supporting conductor and electrically connected thereto, a collector for receiving electrons spaced from said electron emitter, a control electrode comprising at least one elongated element between said electron emitter and said collector, and said element being electrically insulated along substantially its entire active length from said supporting conductor as to direct potentials but being physically in contact therewith in good heat exchange relationship.

4. An electron discharge device, comprising a supporting conductor, means for cooling said conductor, a cathode supported by said supporting conductor and conductively connected thereto, an anode, means for supporting said anode in spaced relation with respect to said cathode, an elongated electrode extending in the space between the cathode and anode, and dielectric means for said elongated electrode along substantially the entire active length thereof between it and said supporting conductor, said last mentioned means affording the electrode a good heat exchange relationship along substantially its entire active length with said supporting conductor and electrically insulating it therefrom as to direct potentials.

5. An electron discharge device, comprising conductive support means having a plurality of slots formed therein, a plurality of cathode elements one extending in alternate slots of said support means and conductively connected thereto, and means for affecting the flow of electrons from said cathode elements and extending in the remaining slots electrically insulated from said first mentioned means as to direct current potential.

6. An electron discharge device, comprising a plurality of cathode elements, a supporting conductor having a plurality of slots formed in the surface thereof, each of said cathode elements extending in alternate slots, and a plurality of elements of substantially T-shaped cross-section respectively supported with dielectric material in the alternate slots between the slots occupied by the cathode elements.

7. An electron discharge device as in claim 6 and means for cooling said supporting conductor.

8. An electron discharge device, as in claim 6 in which each of said elements is supported in a respective slot by a portion of the element corresponding to the "leg" of its T-shaped cross section with another portion which corresponds to the "head" of said cross section extending beyond said cathode elements in a direction away from the supporting conductor.

9. An electron discharge device, comprising a supporting conductor having a plurality of slots formed therein, a plurality of spaced cathode elements each of which extends in an alternate one of said slots, a plurality of electrodes each having a projection extending in the remaining alternate slots of said one supporting conductor, means insulating said projections from said supporting conductor as to direct potential, said cathode elements being conductively connected to said supporting conductor, and means for cooling said supporting conductor, said insulating means connecting said projections and said supporting conductor in good heat exchange relationship and forming a radio frequency by-pass therebetween.

10. An electron discharge device, comprising a pair of spaced supporting conductors one of which has a plurality of slots formed in a surface thereof, a plurality of elongated spaced cathode elements each extending in an alternate one of said slots and conductively connected to said supporting conductors, an anode, means for supporting said anode in spaced relation to said cathode elements, a plurality of elongated elements each having a head and projection portion, said head portions extending in the space between said cathode elements and said anode, said projection portions extending in the remaining alternate slots and capacitively connected to said one supporting conductor, said head portions further extending axially beyond said cathode elements and forming extensions, a shield enclosing one end of said cathode elements and connected to the extensions formed at one end of said elongated elements, and lead-in means connected to said elongated elements.

11. An electron discharge device, comprising an evacuated envelope, a pair of supporting conductors in spaced relation and extending through said envelope, one of said supporting conductors having a plurality of slots formed therein, a plurality of elongated spaced cathode elements each extending in an alternate one of said slots and conductively connected to said supporting conductors, an anode in spaced relation to said cathode elements, means for supporting said anode including a terminal, a plurality of elongated elements each having a head and projection portion, said projection portions extending in the remaining alternate slots, means insulating said projection portions from the walls of said slots and forming a radio frequency by-pass therebetween, said head portions extending in the space between said cathode elements and said anode, said head portions further extending axially beyond said projection portions, a shield connected to said elongated elements adjacent one end of said head portions and enclosing one end of said cathode elements, and a terminal connected to the other ends of said head portions and sealed through said vacuum envelope.

12. An electron discharge device having a gas tight envelope, comprising a pair of coaxial concentric tubular supporting conductors each of which forms a portion of said gas tight envelope, one of said supporting conductors having a plurality of slots formed in a surface thereof within said gas tight envelope, means joining said supporting conductors in insulated gas tight relation at one end thereof, means for cooling the opposed surfaces of said supporting conductors, a plurality of elongated spaced cathode elements each extending in an alternate one of said slots and conductively connected to each of said supporting conductors, an anode, means for supporting and cooling said anode, said anode forming a portion of said gas tight envelope, a plurality of elongated T-shaped elements having head and projection portions, said projection portions extending in the remaining alternate slots of said one supporting conductor, means insulating said projection portions from said one supporting conductor and joining the same in good heat exchange relation, said head portions extending axially beyond said projection portions and forming extensions, and a terminal connected to the extensions at one end of said head portions and sealed through said gas tight envelope.

13. An electron discharge device, comprising conductive support means having a plurality of slots formed therein with lands therebetween, a plurality of cathode elements one extending in alternate slots of said support means and conductively connected thereto, a plurality of grid elements each of which being positioned opposite one of said lands, means for supporting said grid elements, and means for affecting the flow of electrons from said cathode elements and having a portion thereof extending in each of the remaining slots and insulated therefrom as to direct potentials.

14. An electron discharge device, comprising a supporting conductor having a plurality of slots with lands therebetween formed therein, a plurality of spaced elongated cathode elements each extending in alternate slots and conductively connected to said supporting conductor, a plurality of control electrode elements, means supporting each of said control electrode elements spaced from and opposite each of said lands, and a plurality of screen grid elements each having head and projection portions, said head portions extending on the side of said control electrode elements away from said cathode elements, said projection portions extending in the remaining slots in said supporting conductor and dielectric means joining said projection portions to said supporting conductor and forming a radio frequency by-pass therebetween.

15. An electron discharge device, comprising a supporting conductor having a plurality of slots with lands therebetween formed therein, a plurality of spaced elongated cathode elements extending in alternate slots and conductively connected to said supporting conductor, an anode spaced from said cathode elements, a plurality of elongated control grid elements, means for supporting each of said control grid elements in the space between said cathode elements and said anode and opposite said lands, a plurality of elongated screen grid elements having head and projection portions, each of said projection portions extending in each of the remaining alternate slots, means insulating said projection portions from the walls of said slots and forming a radio frequency by-pass, and lead-in means connected to said head portions.

16. An electron discharge device, comprising a supporting conductor having a plurality of slots formed therein with lands therebetween, a plurality of spaced cathode elements each extending in one of said slots, a projection on each of said lands and extending outwardly therefrom, and means for affecting the flow of electrons from said cathode elements physically connected to each of said projections but electrically insulated therefrom as to direct potentials.

17. An electron discharge device, comprising a supporting conductor having a plurality of slots formed therein, a plurality of elongated spaced cathode elements each extending in an alternate one of said slots and conductively connected to said supporting conductor, a plurality of elongated substantially T-shaped elements each having a head and projection portion, a cooling fluid conduit connected to each of said projection portions, each of said projection portions and conduits extending in the remaining alternate slots.

18. An electron discharge device, comprising a supporting conductor having a plurality of slots formed therein, a plurality of spaced elongated cathode elements each extending in alternate slots and conductively connected to said supporting conductor, an elongated anode spaced from said cathode elements, means for supporting said anode, a plurality of substantially T-shaped elements having head and projection portions, said head portions extending in the space between said anode and cathode elements, said projection portions each extending in one of the remaining alternate slots, a fluid conduit extending within each of said last mentioned slots and connected to each of said projection portions, and insulating means connecting said projection portions and said conduit to said slots.

19. An electron discharge device, comprising a supporting conductor having a plurality of slots formed therein with lands therebetween, a plurality of spaced elongated cathode elements each extending in one of said slots and conductively connected to said supporting conductor, an anode spaced from said cathode elements, means for supporting said anode, and a plurality of elements for affecting the flow of electrons from said cathode elements extending in the space between said cathode elements and said anode, and means insulatingly connecting each of said elements to one of said lands along substantially its entire active length.

20. An electron device, comprising a conductive electrode supporting structure, an annular array of spaced-apart directly heated emissive filaments supported thereon, each filament being individually connected to the structure at its two ends, an annular array of spaced-apart electrode elements carried on said structure and positioned in cooperative relationship with the array of filaments to control the flow of electrons therefrom, each element of the last-mentioned array having a portion which extends between a pair of said filaments to a respective portion of the support structure, and dielectric means connecting each of said elements to the portion of the supporting structure to which it extends, said supporting structure including a tubular metallic member, said filaments and said elements extending in directions which are parallel to the axis of said tubular member and adjacent one surface thereof, the opposite surface of said tubular member being adjusted to contact a liquid coolant.

21. An electron device, comprising at least two electrodes in spaced relation, one of said electrodes including an array of spaced apart elements, the other of said electrodes and each of said elements having an elongated active portion, and dielectric means individually connected along substantially the entire active length of each of said elements and to said other electrode along substantially the entire active length of said other electrode, said dielectric means constituting an electrical insulator as to direct current potentials.

22. An electron device, comprising a source of electrons, an output electrode spaced from said source, a first electrode means having an active portion intermediate said source and said output electrode and having a low impedance electrical coupling with said source along substantially the entire active portion thereof, and a second electrode means having an active portion intermediate said first electrode means and said output electrode and insulatively connected to said first electrode means along substantially the entire active portion thereof.

23. An electron device, comprising an elongated source of electrons, an elongated output electrode spaced from said source, a first electrode means having an elongated active portion intermediate said source and said output electrode and having a low impedance electrical coupling with said source along substantially the entire active length thereof, a second electrode means having an elongated active portion intermediate said first electrode means and said output electrode, and elongated insulative means insulatively connecting said first electrode means to said second electrode means along substantially the entire active length thereof.

24. An electron device, comprising a source of electrons, an output electrode spaced from said source, means supporting said source and having a low impedance electrical coupling with said source, another electrode having an active portion intermediate said source and said output electrode, and electrically insulative thermally conductive means connected to said another electrode substantially along the entire active portion of said another electrode and to said first-mentioned means.

25. An electron device, comprising a source of electrons, means supporting said source and including a conductive member having a low impedance electrical coupling with said source, an output electrode spaced from said source, another electrode having an active portion intermediate said source and said output electrode, and electrically insulative thermally conductive means connected to said another electrode along substantially the entire active portion of said another electrode and to said conductive member.

26. An electron device, comprising a source of electrons, means supporting said source and including of conductive member having a low impedance electrical coupling with said source, an output electrode spaced from said source, another electrode having an active portion intermediate said source and said output electrode, and dielectric thermally conductive means connected to said another electrode along substantially the entire active portion of said another electrode and to said conductive member and maintaining the same in good heat exchange relationship, said last-mentioned means electrically insulating said other electrode from said conductive member as to direct current potentials.

27. An electron device, comprising a source of electrons, conductive means supporting said source and having a low impedance electrical coupling with said source, an output electrode spaced from said source, another electrode having an active portion intermediate said source and said output electrode, capacitive means connected to said another electrode, along substantially the entire active portion of said another electrode and to said first mentioned means, said last mentioned means forming a good capacitive connection with respect to alternating current potentials and an insulating connection as to direct current potentials.

28. An electron device, comprising a source of electrons, means supporting said source and including a conductive member connected to said source, an output electrode spaced from said source, another electrode having an active portion intermediate said source and said output electrode, dielectric thermally conductive means connected to said another electrode along substantially the entire active portion of said another electrode and to said conductive member, said last mentioned means forming a good capacitive connection with respect to alternating current potentials and an insulating connection as to direct current potentials, and means for cooling said conductive member.

29. An electron device, comprising a source of electrons, an output electrode spaced from said source, means supporting said source and including a first electrode means having an active portion intermediate said source and said output electrode, a second electrode means intermediate said first electrode means and said output electrode, a third electrode means intermediate said second electrode means and said output electrode, and dielectric thermally conductive means connected between said third electrode means and to said first electrode means along substantially the entire active portion thereof, said last mentioned means insulating said first and third electrode means as to direct current potentials and maintaining the same in good heat exchange relationship.

30. An electron device as described in claim 29 wherein said third electrode means substantially shields said second electrode means.

31. An electron device, comprising a source of electrons, an output electrode spaced from said source, means supporting said source, a control electrode intermediate said source and said output electrode, another electrode intermediate said control electrode and said output electrode, and dielectric means connected to said first mentioned means and said another electrode along substantially the entire active portion of said another electrode.

32. An electron device as claimed in claim 31 wherein said another electrode substantially shields said control electrode from said output electrode.

33. An electron device, comprising a source of electrons, an output electrode spaced from said source, means supporting said source and including a conductive member having a low impedance coupling with said source, a control electrode intermediate said source and said output electrode, another electrode intermediate said control electrode and said output electrode, and dielectric means connected to said conductive member and to said another electrode along substantially the entire active portion of said another electrode, said last mentioned means electrically insulating said another electrode from said conductive member as to direct current potentials.

34. An electron device as described in claim 33 wherein said last mentioned means is thermally conductive and maintains said another electrode and said conductive member in good heat exchange relationship.

35. An electron device as described in claim 34 wherein said means supporting said source includes means for cooling said conductive member.

WILLIAM N. PARKER.

References Cited in the file of this patent

UNITED STATES PATENTS

| Number | Name | Date |
|---|---|---|
| 1,944,190 | Mouromtseff | Jan. 23, 1934 |
| 1,961,192 | Bowles | June 5, 1934 |
| 2,380,502 | Clark et al. | July 31, 1945 |
| 2,419,485 | Desch et al. | Apr. 22, 1947 |